March 3, 1970         D. G. MORGAN         3,498,209
SYSTEM FOR DEHYDRATING FOOD OR THE LIKE
Filed Aug. 15, 1968
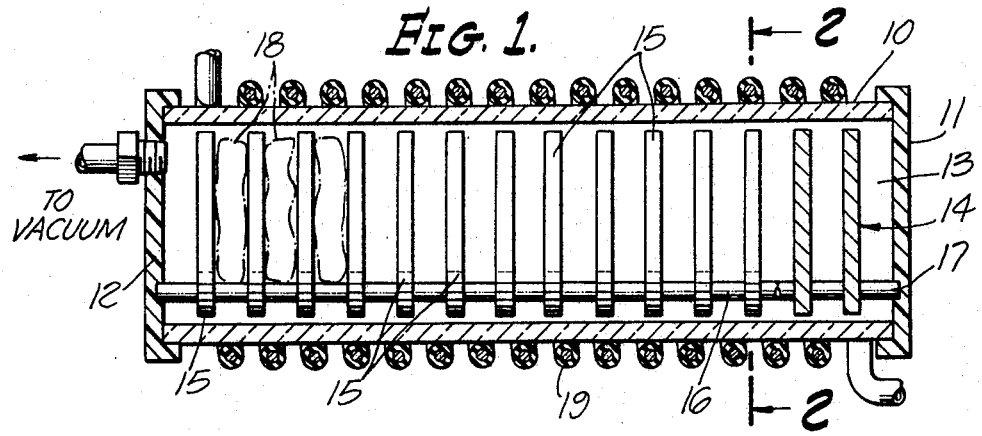
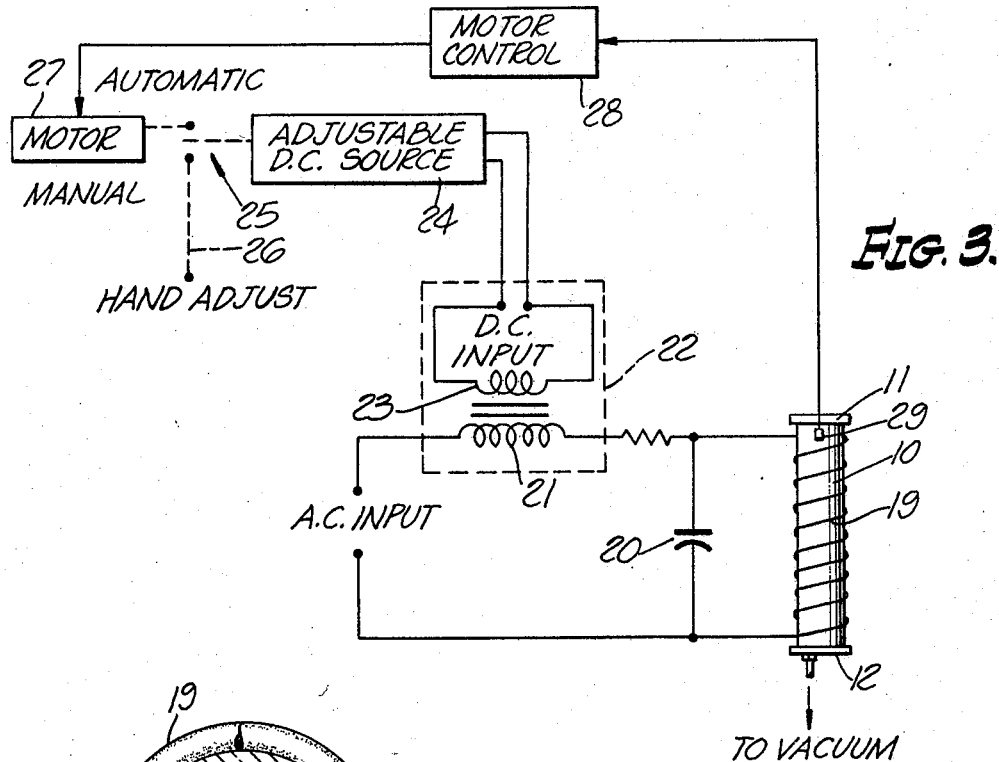
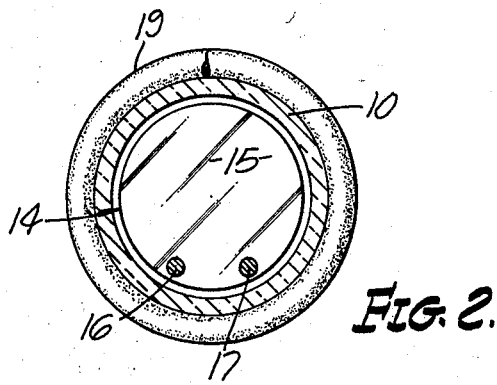
INVENTOR
DONALD G. MORGAN
BY
ATTORNEYS United States Patent Office 3,498,209
Patented Mar. 3, 1970

3,498,209
SYSTEM FOR DEHYDRATING FOOD OR THE LIKE
Donald G. Morgan, 2858 Ellesmere, Box 1439, Costa Mesa, Calif. 92626
Filed Aug. 15, 1968, Ser. No. 752,919
Int. Cl. A23b 5/02; A23c 1/00; A23l 3/00; B65d 9/00
U.S. Cl. 99—246                                    9 Claims

ABSTRACT OF THE DISCLOSURE

A system for dehydrating foods or the like in which the food is positioned between the plates of a rack enclosed in a suitable insulated and evacuated chamber. The food is heated by means of eddy currents induced in the plates. The eddy currents are induced by a coil wrapped around the chamber. The coil is part of a resonant circuit which is caused to resonate at conventional power frequencies.

BACKGROUND OF THE INVENTION

It is known that the dehydration of various types of food permit the food to be kept for long periods of time without spoiling. Various methods of dehydratin have been proposed and are in use. These methods generally involve heating the food in an evacuated chamber to drive off the water contained in the food. One particular method intermixes the food to be dehydrated with a plurality of conductive metal spheres in a chamber that is then evacuated. A coil is positioned around the evacuated chamber and high frequency power applied to the coil with the result that eddy currents are induced in the metal spheres. The eddy currents in the spheres produce heat which is conductively transferred to the food causing the water in the food to be liberated.

While this method is satisfactory in some respects, it has two major disadvantages. First, the use of high frequency energy presents many practical difficulties as will be apparent to those skilled in the art. This is particularly the case where it is desired to use a single source to energize the windings wrapped around a number of individual evacuated chambers. The other disadvantage of this system is the non-uniformity of heating which results from the use of the metal spheres. In other words, the individual pieces of food are not all raised to the same temperature during any given time so that full reliability of the method is not possible within practical time limitations.

SUMMARY OF THE INVENTION

According to the present invention, a system has been provided which provides greater uniformity of heating of the individual food pieces with a resulting increase in reliability which permits the use of an economical time cycle wtih reasonable assurance that all of the food pieces will be dehydrated to the degree desired. The system also permits the use of power frequency electrical power and thus eliminates the shielding and other problems inherent with high frequency power such as that used in the past. As used herein, "power frequency" means the frequency at which power is conventionally supplied to a user by a utility company, generally 60 cycles per second in the United States. These advantages are accomplished by using a rack made up of a series of conductive plates which holds the food to be dehydrated, individual pieces of the food being positioned between the plates. Eddy currents are induced in the plates by a coil wrapped around the evacuated chamber in which the rack is positioned. The use of these plates with their relatively large area permits the use of power frequency energy to provide the inductive heating. In order to obtain maximum efficiency, the coil is connected in a resonant circuit which insures that a relatively pure sine wave will exist in the coil and that the voltage and current in the coil will be in phase so that the coil will not be overheated by reactive power.

It is therefore an object of the present invention to provide an improved system for dehydrating food or the like.

BRIEF DESCRIPTION OF THE DRAWINGS

FIGURE 1 is a cross-sectional view of the workholding assembly of the present invention;

FIGURE 2 is a view taken along lines 2-2 of FIGURE 1; and

FIGURE 3 is a schematic diagram of the control circuit of the present invention.

DESCRIPTION OF THE INVENTION

Turning now to FIGURE 1, the workholding assembly is seen to comprise a vessel 10 made of glass or other similar insultating material and having end caps 11 and 12 to form a sealed chamber 13 in which is placed a rack 14 which holds the articles to be dehydrated. The end cap 12 is provided with a suitable fitting to connect the chamber 13 with a suitable vacuum drawing device. As can be seen, the rack 14 is comprised of a plurality of generally parallel plates 15 connected together by rods 16 and 17. While two rods are shown, it will be obvious that any number of rods or other suitable connecting elements could be used for the purpose of maintaining the plates 15 at a desired spaced distance.

Articles of food 18 such as meat patties, steaks, or any other suitable article, are positioned between adjacent plates 15 and supported by the rods 16 and 17. An electrical coil 19 is wrapped around the vessel 10 and is connected in parallel with a capacitor 20 to form a resonant circuit, preferably having a resonant frequency of approximately 60 cycles per second. The resonant circuit 19, 20 is connected to an A.C. voltage source through the load winding 21 of a saturable reactor 22, the saturable reactor being used to control the current in the coil 19. The impedance of the load winding 21 of the reactor 22 is controlled by the magnitude of a D.C. current supplied to the control winding 23 of the reactor 22. The D.C. current is supplied by an adjustable D.C. source 24 which can be controlled either manually or automatically by means of a coupling 25 which connects the adjustable D.C. source 24 to either a manual adjustment mechanism shown schematically at 26 or a motor 27. The motor 27 is controlled by a motor control 28 which is in turn controlled by the output of a sensor 29 associated with the vessel 10. This sensor preferably detects the temperature in the chamber 13 of the vessel 10 and controls the current flow to the coil 19 accordingly.

The system described results in an even heating of the food articles positioned in the rack 14. The current in the coil 19 induces eddy currents in the plates 15 which in turn are transformed into heat energy due to the resistance of the material of the plates. This heat energy is transferred uniformly and evenly to the articles of food or other work positioned between the plates 15. The coupling of the capacitor 20 to the coil 19 insures that the current in the coil 19 will be substantially sinusoidal and in phase with the input voltage regardless of any distortions that are introduced by the saturable reactor. Consequently, maximum heating efficiency is obtained. The plates 15 are preferably constructed of stainless steel or aluminum but may be of any other suitable conducting material. The spacing of the plates, of course, is determined by the size and shape of the articles to be positioned between them. It will be obvious that any number of coils 19 associated with individual vessels 10 can be driven from a single source, such as conventional power lines. If desired, a three-phase source can be utilized with individual coils being driven by each of the phase of the source.

What is claimed is:

1. A system for heating a plurality of articles comprising:
   a rack for holding said articles, said rack comprising a plurality of electrically conductive plates spaced apart sufficiently to receive individual ones of said articles between adjacent plates;
   a vessel having a chamber for receiving said rack;
   a coil wound around said vessel;
   a capacitor connected in parallel with said coil to form a resonant circuit; and
   means for connecting said resonant circuit to a source of electrical power.

2. The system of claim 1 wherein said resonant circuit has a resonant frequency of approximately 60 cycles per second.

3. The system of claim 1 wherein said connecting means include means for controlling the power supplied to said resonant circuit.

4. The system of claim 1 wherein means are provided for evacuating said chamber.

5. The system of claim 1 wherein said connecting means include means for controlling the power supplied to said resonant circuit.

6. The system of claim 5 further comprising means associated with said vessel and responsive to the temperature in said chamber for controlling said power controlling means.

7. The system of claim 5 wherein said power controlling means comprises a saturable reactor.

8. A system for dehydrating a plurality of food articles comprising:
   a rack having a plurality of spaced, electrically conducting plates, said plates being generally parallel and spaced apart a distance sufficient to receive individual food articles therebetween;
   an insulating vessel having a chamber for receiving said rack;
   means for evacuating said chamber;
   a coil wound around said vessel whereby a current passed through said coil causes eddy currents to be induced in said plates;
   a capacitor connected in parallel with said coil to form a power frequency resonant circuit therewith; and
   means for connecting said resonant circuit to a source of electrical power.

9. The system of claim 8 wherein the resonant frequency of said resonant circuit is approximately 60 cycles per second.

References Cited

UNITED STATES PATENTS

| | | | |
|---|---|---|---|
| 2,006,059 | 6/1935 | Rudorff | 219—43 |
| 2,339,974 | 1/1944 | Austin | 99—253 |
| 2,344,754 | 3/1944 | Vang | 99—253 |
| 2,659,802 | 11/1953 | Garrett | 219—43 |

ROBERT W. JENKINS, Primary Examiner